(12) United States Patent
Takahashi

(10) Patent No.: US 7,415,636 B2
(45) Date of Patent: Aug. 19, 2008

(54) METHOD AND APPARATUS FOR REPLACEMENT PROCESSING

(75) Inventor: Eisaku Takahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 454 days.

(21) Appl. No.: 11/017,946

(22) Filed: Dec. 22, 2004

(65) Prior Publication Data
US 2006/0075291 A1    Apr. 6, 2006

(30) Foreign Application Priority Data
Sep. 17, 2004 (JP) ............... 2004-271861

(51) Int. Cl.
 *G06F 11/00* (2006.01)
(52) U.S. Cl. ............ 714/42; 714/6; 714/7; 714/8; 714/718; 369/53.17; 360/53
(58) Field of Classification Search ............ 714/7, 714/8, 42; 369/53.17
See application file for complete search history.

(56) References Cited

U.S. PATENT DOCUMENTS

| | | | | |
|---|---|---|---|---|
| 5,602,814 A | * | 2/1997 | Jaquette et al. ......... | 369/47.53 |
| 6,233,108 B1 | * | 5/2001 | Inoue ................. | 360/53 |
| 6,854,071 B2 | * | 2/2005 | King et al. .............. | 714/8 |
| 7,050,252 B1 | * | 5/2006 | Vallis ................ | 360/53 |
| 2003/0031106 A1 | * | 2/2003 | Ozaki ............. | 369/53.17 |

FOREIGN PATENT DOCUMENTS

| | | |
|---|---|---|
| JP | 9-212311 | 8/1997 |
| JP | 10-247133 | 9/1998 |
| JP | 2002-215336 | 8/2002 |
| WO | WO98/41915 | 9/1998 |

* cited by examiner

*Primary Examiner*—Emerson C Puente
(74) *Attorney, Agent, or Firm*—Staas & Halsey LLP

(57) ABSTRACT

A recording-medium controlling apparatus that performs a read-access and a write-access of a recording medium in response to access request from a higher-level apparatus, detects a read error that occurs at a time of the read access, and performs a replacement processing, includes an error detecting unit that tries a plurality of the read accesses to an error location on the recording medium to detect whether the read error recurs a plurality of times; and a replacement processing unit that performs, when the error detecting unit detects that the read error recurs a plurality of times, a replacement processing for the error location.

7 Claims, 8 Drawing Sheets

- LOCATIONS WHERE READ ERRORS OCCUR
- LOCATIONS SURROUNDING THOSE WHERE REPLACEMENT PROCESSING IS PERFORMED
- LOCATIONS WHERE REWRITE ACCESS IS SUCCESSFUL

- LOCATIONS WHERE READ ERRORS DO NOT REOCCUR IN ERROR DETECTION
- LOCATIONS WHERE REPLACEMENT PROCESSING IS PERFORMED IN ERROR DETECTION

FIG.8

| TIMING OF ERROR DETECTION | • DURING DISK PATROL<br>• ANOTHER RETROSPECTIVE TIMING<br>• IMMEDIATELY AFTER ERROR<br>    ⋮ |
|---|---|
| TARGETS FOR ERROR DETECTION | • READ ERROR LOCATIONS ONLY<br>• READ ERROR LOCATIONS AND LOCATIONS SURROUNDING ERROR LOCATIONS<br>• READ ERROR LOCATIONS AND SUCCESSFUL REWRITE LOCATIONS<br>• READ ERROR LOCATIONS, LOCATIONS SURROUNDING ERROR LOCATIONS, AND SUCCESSFUL REWRITE LOCATIONS |
| METHODS OF ERROR DETECTION | • ONLY MULTIPLE READ ACCESSES<br>• WRITE DATA AND REDETECT (ONCE/MULTIPLE TIMES) AFTER MULTIPLE READ ACCESSES<br>• WRITE DATA AND REDETECT (ONCE/MULTIPLE TIMES) AFTER MULTIPLE READ ACCESSES + REPLACEMENT PROCESSING IF SUCCESSFUL REDETECTION LOCATION IS ERROR LOCATION<br>• WRITE DATA AND READ ACCESS (ONCE/MULTIPLE TIMES) |

METHOD AND APPARATUS FOR REPLACEMENT PROCESSING

BACKGROUND OF THE INVENTION

1) Field of the Invention

The present invention relates to a method and an apparatus for controlling a recording medium and a computer product for performing a read-access or a write-access of a recording medium in response to an access request from a higher-level apparatus, detecting a read error that occurs during the read-access, and performing a replacement processing.

2) Description of the Related Art

A conventional disk controlling apparatus, known as a disk array or a redundant array of inexpensive disks (RAID), uses a plurality of disks to obtain high performance and high reliability when executing. parallel operations. In this type of disk controlling apparatus, when a read error has occurred in response to a read access of the disk, the data to be extracted is reconstructed from data stored in another disk. In addition, the disk controlling apparatus determines whether the read error is caused by a fundamental medium failure, and performs replacement processing accordingly.

More specifically, when a read error occurs, the disk controlling apparatus retries to read-access a sector where the error occurred. When data is successfully extracted in the retry, the apparatus determines the error to be a sporadic read error, and transfers the extracted data in the usual manner to the higher-level apparatus (host computer). On the other hand, when the retry results in another read error, the apparatus determines that the read error is caused by a fundamental medium failure, reconstructs the data to be extracted from another disk, allocates a new sector to replace the one where the error occurred, and writes the reconstructed data in the replacement sector (see, for example, Japanese Patent Application Laid-open No. H10-247133).

However, the conventional technology described above cannot accurately determine what caused the read error. When replacement processing is not carried out where it is needed, the result is poor performance and double malfunctions, and when replacement processing is carried out in locations where it is not needed, the replacement region is wasted.

Namely, in the conventional technology described above, the decision of whether replacement processing is required is made based on whether another read error is generated in response to a retry at the location where the first error occurred. However, when the read error is the result of a minor medium failure rather than a serious one, a retry may not always produce another read error, so that the apparatus determines that the read error is sporadic and does not perform replacement processing. In this case, even when the medium failure is a minor one, frequent read errors will subsequently occur in the same location. Retrying every time there is a read error will reduce the performance of the disk controlling apparatus, and ignoring this type of medium failure by not performing replacement processing may lead to double malfunctions.

On the other hand, a read error sometimes occurs sporadically in response to a retry, even when there is no failure whatsoever in the medium. The conventional technology described above performs replacement processing even for these read errors. In this case, since there is no medium failure where the read error occurred, and therefore no need for replacement, the replacement region is wastefully consumed.

Data is sometimes lost due to thermal demagnetization caused by the impact when the head of the disk contacts the medium. In the conventional technology described above, when a read error is caused by thermal demagnetization, retries will always result in read errors, so that the apparatus determines that there is a fundamental medium failure and performs replacement processing. In this case, since there is no medium failure where the read error occurred, it being possible to extract the data normally by rewriting it, the replacement region is wastefully consumed.

SUMMARY OF THE INVENTION

It is an object of the present invention to solve at least the above problems in the conventional technology.

A recording-medium controlling apparatus according to one aspect of the present invention, which performs a read-access and a write-access of a recording medium in response to access request from a higher-level apparatus, detects a read error that occurs at a time of the read access, and performs a replacement processing, includes an error detecting unit that tries a plurality of the read accesses to an error location on the recording medium to detect whether the read error recurs a plurality of times; and a replacement processing unit that performs, when the error detecting unit detects that the read error recurs a plurality of times, a replacement processing for the error location.

A recording-medium controlling apparatus according to another aspect of the present invention, which performs a read-access and a write-access of a recording medium in response to access request from a higher-level apparatus, detects a read error that occurs at a time of the read access, and performs a replacement processing, includes a data writing unit that writes data into an error location on the recording medium where the read error occurred; an error detecting unit that tries a read access to the error location, where the data is written by the data writing unit, to detect whether the read error recurs; and a replacement processing unit that performs, when the error detecting unit detects that the read error recurs, a replacement processing for the error location.

A recording-medium controlling method according to still another aspect of the present invention, which is for performing a read-access and a write-access of a recording medium in response to access request from a higher-level apparatus, detecting a read error that occurs at a time of the read access, and performing a replacement processing, includes trying a plurality of the read accesses to an error location on the recording medium to detect whether the read error recurs a plurality of times; and performing, when the error detecting unit detects that the read error recurs a plurality of times, a replacement processing for the error location.

A recording-medium controlling method according to still another aspect of the present invention, which is for performing a read-access and a write-access of a recording medium in response to access request from a higher-level apparatus, detecting a read error that occurs at a time of the read access, and performing a replacement processing, includes writing data into an error location on the recording medium where the read error occurred; trying a read access to the error location, where the data is written at the writing, to detect whether the read error recurs; and performing, when the read error is detected to be recurred at the trying, a replacement processing for the error location.

A computer-readable recording medium according to still another aspect of the present invention stores computer programs that cause a computer to execute the above recording-medium controlling methods according to the present invention.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 8 is a diagram for explaining timings, targets, and methods of error detection.

DETAILED DESCRIPTION

Exemplary embodiments of a method and an apparatus for controlling a recording medium, and a computer product according to the present invention will be explained in detail with reference to the accompanying drawings. A disk controlling apparatus that controls a disk apparatus including a RAID 1 (a disk apparatus having a plurality of redundant disks) will be explained as a first embodiment of the present invention, followed by a second embodiment of the present invention.

Figure 1:
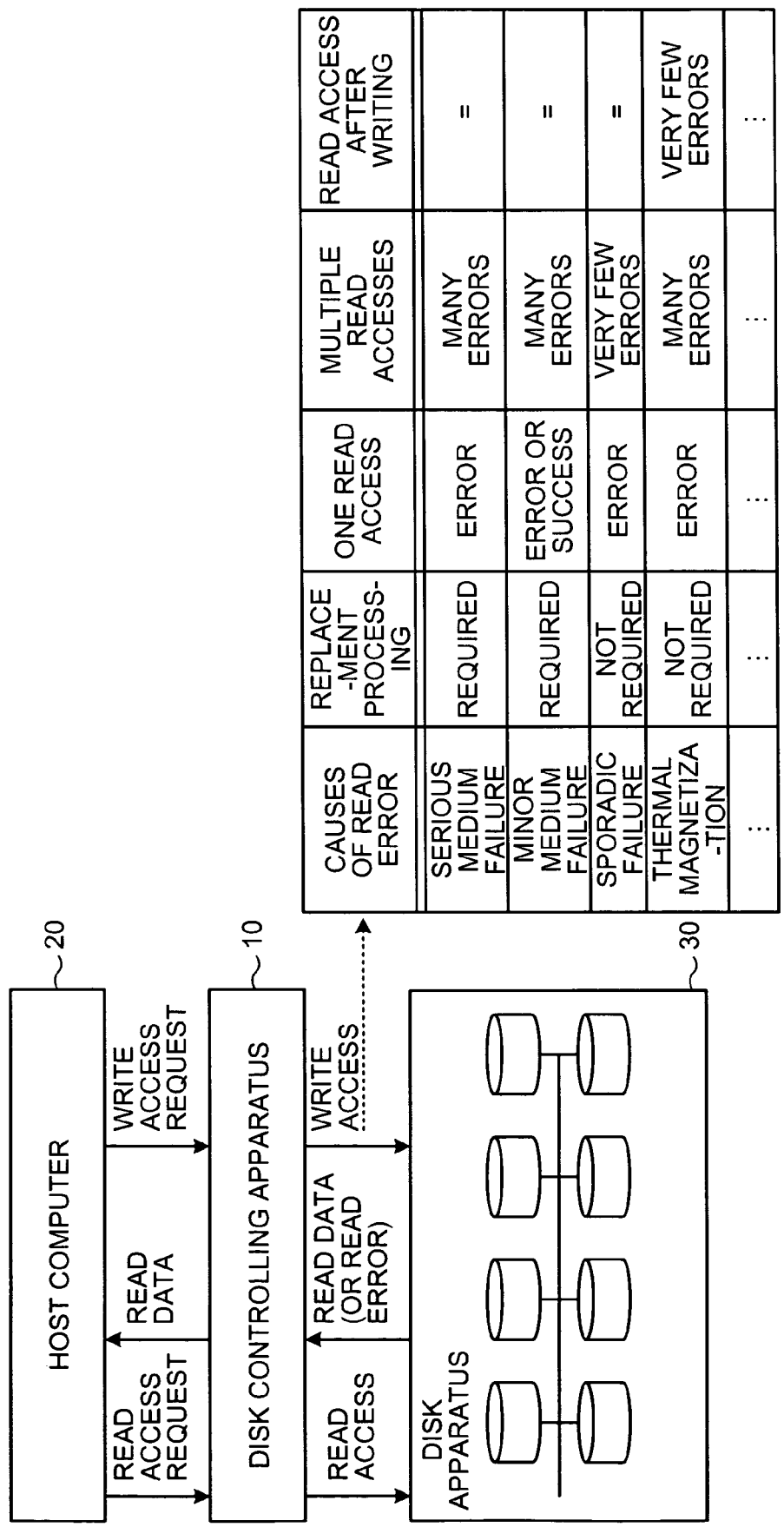
FIG. 1 is a diagram of the schematic outline and characteristics of a disk controlling apparatus according to a first embodiment of the present invention.

FIG. 1 is a diagram of the schematic outline and characteristics of the disk controlling apparatus according to the first embodiment. As shown in FIG. 1, a disk controlling apparatus 10 read-accesses and write-accesses a disk apparatus 30 that includes a plurality of redundant disks, in response to read access requests and write access requests from a higher-level apparatus, being a host computer 20.

When data has been read by a read access, the disk controlling apparatus 10 transfers the data read to the host computer 20. When the disk apparatus 30 responds to the read access with a read error (an error indicating that the data cannot be read), the disk controlling apparatus 10 reconstructs the data to be read by reading it from another mirror disk, and transfers the reconstructed data to the host computer 20. The disk controlling apparatus 10 also checks whether the read error is caused by a fundamental medium failure, and if so, allocates another sector to replace the one where the read error occurred, and writes the data, which is read from the mirror disk, in the replacement sector.

Similarly, when a write error occurs, indicating that data cannot be written in response to a write access, the disk controlling apparatus 10 retries the write access. When the second write access also results in a write error, the disk controlling apparatus 10 selects another sector as a new sector for writing, and writes the data in the new sector.

According to the first embodiment, a sector where a read error has occurred on the disk is termed an "error location". Processing to allocate a new sector to replace the error location, and write reconstructed data thereto, is termed "replacement processing". Processing to detect the cause of the read error, and determine whether replacement processing is necessary, is termed "error detection". A location where data is written by a second write access following a write error is termed a "rewrite location".

The main characteristics of the disk controlling apparatus 10 having this schematic outline are apparent during error detection. Specifically, the disk controlling apparatus 10 determines whether a read error is repeated many times by retrying multiple read accesses in the error location. When the read error is repeated many times, the disk controlling apparatus 10 determines that there is a medium failure that cannot be ignored, and performs replacement processing. This enables the disk controlling apparatus 10 to determine precisely whether a read error requires replacement processing, and perform replacement processing where appropriate.

As shown in FIG. 1, read errors are caused by, for example, serious medium failures, minor medium failures, sporadic failures, and the like. Serious medium failure clearly requires replacement processing. For example, even when error detection is made by a single retry (a method whereby replacement processing is performed when a read error reoccurs in response to one read access in an error location), a read error reoccurs, and replacement processing is performed as appropriate.

However, when the read error is caused by a minor medium failure, although replacement processing may be necessary in order to avoid reducing the performance of the disk controlling apparatus 10 and preventing double malfunctions, the read error is not always reproduced by a single retry, so that appropriate replacement processing is not performed. On the other hand, when a read error occurs sporadically in response to one retry, replacement processing is performed unnecessarily, wastefully consuming a replacement region on the disk.

Accordingly, the disk controlling apparatus 10 performs replacement processing when many read errors (e.g. more than two) have reoccurred after retrying a plurality of read accesses (e.g. several tens or several hundreds) in the error location. This ensures that replacement processing is performed when many read errors have occurred due to serious or minor medium failures, but not when many read errors have been caused sporadically. As described above, the disk controlling apparatus 10 can thereby determine precisely whether a read error requires replacement processing, and perform replacement processing where appropriate. This avoids reducing the performance of the disk controlling apparatus 10, and prevents double malfunctions, while also avoiding wasteful consumption of replacement regions of the disk.

As shown in FIG. 1, one cause of read errors is thermal demagnetization. In this case, data is lost by the impact generated when the head of the disk contacts the medium, but can be read normally by rewriting it, and therefore, replacement processing is not necessary in theory. However, while the data is lost, one or multiple read accesses made during error detection will always result in a read error, so that replacement processing will be performed, wastefully consuming a replacement region on the disk.

Accordingly, in addition to the main characteristics mentioned above, even when many read errors have reoccurred, the disk controlling apparatus 10 writes data in the error location and then retries a read access to determine whether a read error has reoccurred before performing replacement processing. When no further read error is generated during error detection, executed after writing data with respect to a read error caused by thermal demagnetization, replacement processing is not performed. This prevents wasteful consumption of a replacement region of the disk.

The disk controlling apparatus 10 has the following additional characteristics. The disk controlling apparatus 10 stores locations, where read errors stopped reoccurring in error detection after writing, as "successful retry locations", and, when a read error reoccurs in a successful retry location, performs replacement processing without error detection. Error detection is not executed when a read error occurs, but is executed retrospectively by storing information that identifies the error location. Similar error detection is executed in locations surrounding one where replacement processing has already been performed, prior to performing replacement processing in them. Similar error detection is executed in a rewrite location, where data is written by rewrite access following a write error, before performing replacement processing therein.

Figure 2:
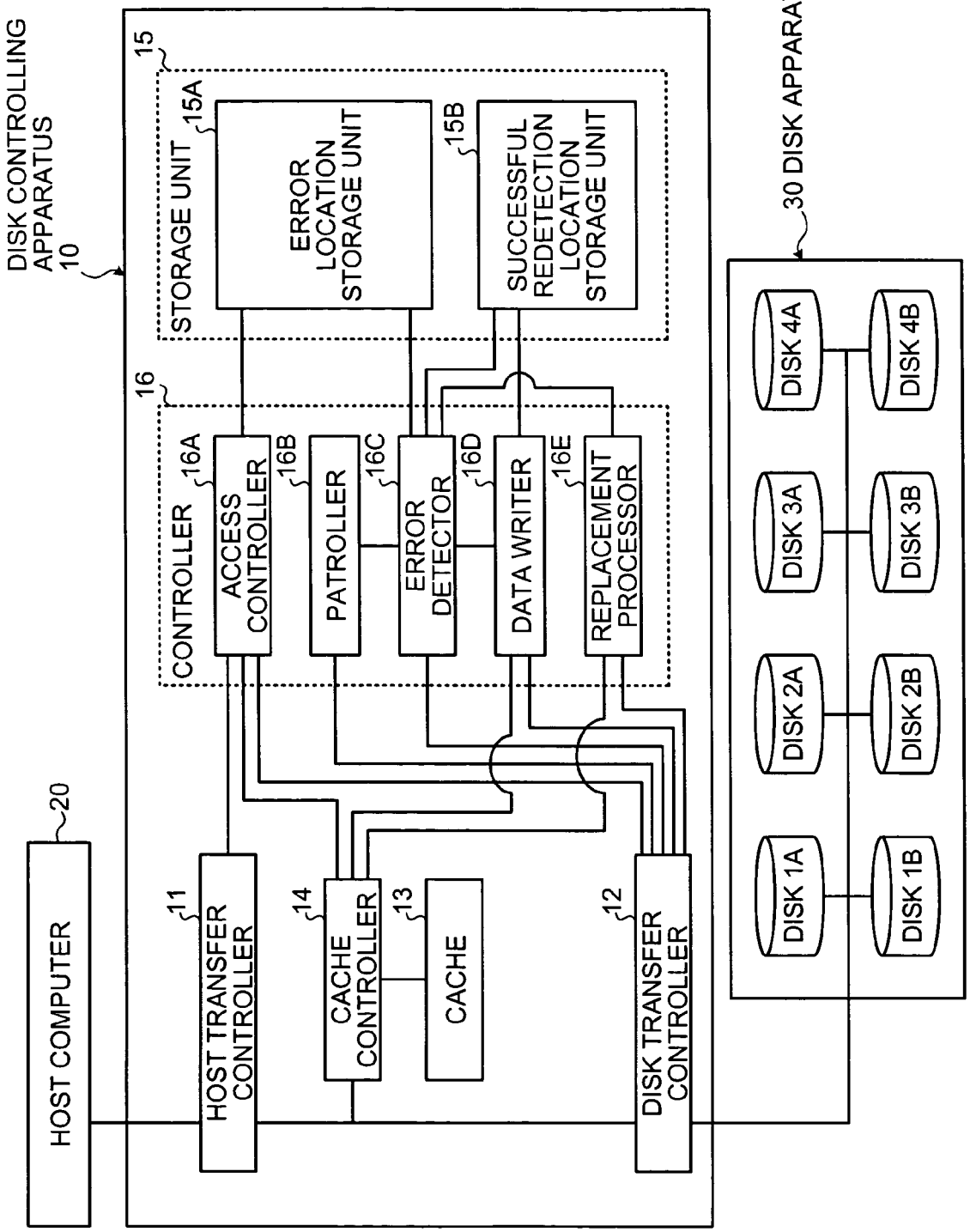
FIG. 2 is a block diagram of the constitution of the disk controlling apparatus according to the first embodiment.
Figure 3:
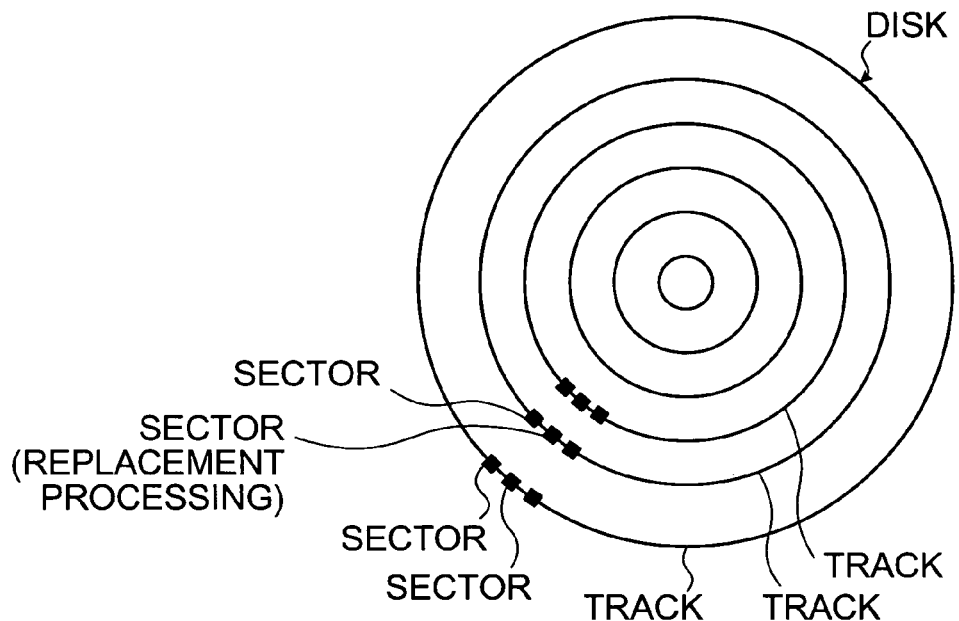
FIG. 3 is a diagram of tracks and sectors on a disk.
Figure 4:
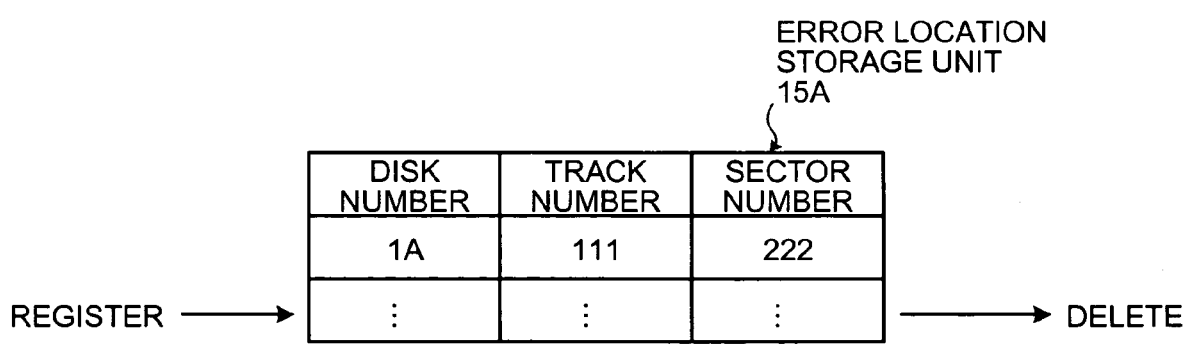
FIG. 4 is a diagram for explaining an error-location storing unit.
Figure 5:
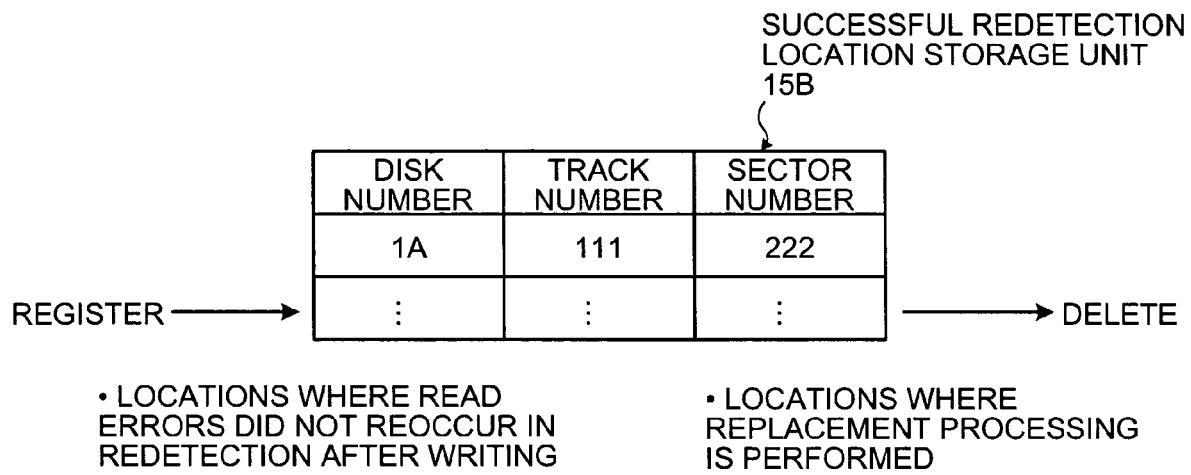
FIG. 5 is a diagram for explaining a successful-retry-location storing unit.

FIG. 2 is a block diagram of the constitution of the disk controlling apparatus 10 according to the first embodiment; FIG. 3 is a diagram of tracks and sectors on a disk; FIG. 4 is a diagram for explaining an error-location storing unit; and FIG. 5 is a diagram for explaining a successful-retry-location storing unit.

As shown in FIG. 2, the disk controlling apparatus 10 is connected to the host computer 20 and the disk apparatus 30 via a small computer system interface (SCSI) bus, a peripheral component interconnect (PCI) bus, or the like. The host computer 20 is a higher-level apparatus that transmits read access requests and write access requests to the disk controlling apparatus 10.

As shown in FIG. 2, the disk apparatus 30 includes a plurality of redundant disks that are connected via a predetermined bus. Each disk includes a rotating disk-like recording medium (magnetic recording medium, optical recording medium, optical-magnetic recording medium, or the like), and a head that reads/writes data by moving over the recording medium in its radial direction, and the like. As shown by way of example in FIG. 3, on each disk, the recording medium is divided into a plurality of concentric circular regions termed "tracks", and each track is divided into units termed "sectors", data being read in sector units (generally 512 byte units).

As shown in FIG. 2, the disk controlling apparatus 10 includes a host transfer controller 11, a disk transfer controller 12, a cache 13, a cache controller 14, a storage unit 15, and a controller 16, these being connected by a predetermined bus. These parts will be explained below.

The host transfer controller 11 is a protocol processor that includes a direct memory access (DMA) for controlling data transfer between the disk controlling apparatus 10 and the host computer 20. For example, when a read access request or a write access request is received from the host computer 20, an interrupt request is sent to the controller 16 (an access controller 16a described later). When a data transfer command in response to a write access request is received from the access controller 16a, write data sent from the host computer 20 are stored in the cache 13. When data that is read corresponding to a read access request (and data that is reconstructed after a read error) is stored in the cache 13, the data stored in the cache 13 is transferred to the host computer 20 corresponding to the command from the access controller 16a.

The disk transfer controller 12 is a protocol processor that includes a disk-side DMA for controlling the data transfer between the disk controlling apparatus 10 and the disk apparatus 30. For example, when write data is stored in the cache 13 in compliance with a write access request, the disk transfer controller 12 writes the data stored in the cache 13 in a predetermined sector of a predetermined track on a predetermined disk in the disk controlling apparatus 10, corresponding to a command from the access controller 16a. When a read access command corresponding to a read access request is received from the access controller 16a, the disk transfer controller 12 reads the data specified by the read access request from a predetermined sector of a predetermined track on a predetermined disk in the disk controlling apparatus 10, and stores the read data in the cache 13. When a read error occurs, alternative data is read from a mirror disk corresponding to a command from the access controller 16a, and this reconstructed data is stored in the cache 13.

The cache 13 is a memory that temporarily stores write data sent from the host computer 20, and read data that is read from the disk apparatus 30 (as well as data that is reconstructed when there is a read error). The cache controller 14 is a processor that controls the reading/writing of data from/to the cache 13.

The storage unit 15 is a memory that stores data and programs, required in various types of processes that are executed by the controller 16. As shown in FIG. 2, the storage unit 15 includes an error-location storing unit 15a and a successful-retry-location storing unit 15b. These are of particular relevance to the present invention. The error-location storing unit 15a corresponds to an "error-location storing unit" disclosed in the appended claims, and the successful-retry-location storing unit 15b also corresponds to a "successful-retry-location storing unit" in the appended claims.

In the storage unit 15, the error-location storing unit 15a stores information relating to error locations on disks. Specifically, as shown in the example of FIG. 4, the error-location storing unit 15a stores position information that includes a disk number, a track number, and a sector number. The error locations stored in the error-location storing unit 15a include not only locations where read errors have occurred, but also locations that surround locations where replacement processing has been performed (e.g. the eight locations adjacent to the location of replacement processing shown in FIG. 3), and rewrite locations where data has been rewritten by rewrite access following a write error. This is so that errors can be detected in the surrounding locations and the rewrite locations, in the same manner as in normal error locations. The error location information stored in the error-location storing unit 15a is deleted when a read error has ceased to reoccur during error detection, and when replacement processing has been performed.

The successful-retry-location storing unit 15b stores information relating to error locations where read errors have ceased to reoccur during error detection following writing (described later), as successful retry locations. Specifically, as shown in the example of FIG. 5, the successful-retry-location storing unit 15b stores position information that includes a disk number, a track number, and a sector number. The successful-retry-location storing unit 15b stores error locations where read errors have ceased to reoccur during error detection following writing, from among the error locations stored in the error-location storing unit 15a. This is so that replacement processing can be performed without error detection when a read error has reoccurred in the successful retry location. The successful retry location information stored in the successful-retry-location storing unit 15b is deleted when replacement processing has been performed.

Returning to the explanation of the disk controlling apparatus 10, the controller 16 has an internal memory for storing control data and programs that specify various types of processing sequences, and functions as a processor that executes various processes based on the control data and programs. Of particular relevance to the present invention are the access controller 16a, a patroller 16b, an error detector 16c, a data writer 16d, and a replacement processor 16e, shown in FIG. 2. The error detector 16c corresponds to an "error detecting unit", the data writer 16d corresponds to a "data-writing unit", and the replacement processor 16e also corresponds to a "replacement processing unit", all in the appended claims.

In the controller 16, the access controller 16a is a processor that processes read access requests and write access requests from the host computer 20 by controlling the host transfer controller 11, the disk transfer controller 12, the cache 13, and the cache controller 14. In access control processing executed by the access controller 16a, when the disk controlling apparatus 10 responds with a read error, the access controller 16a registers information identifying the location of the read error in the error-location storing unit 15a, and, when data has been written by a rewrite access after a write error, registers information identifying the rewrite location in the error-location storing unit 15a. The access control processing will be explained in detail later, with reference to FIG. 6.

The patroller 16b is a processor that patrols the entire side of each disk of the disk apparatus 30 to detect irregularities therein, performing diagnosis and repair at locations where irregularities are detected. Patrol processing is performed when an error location is not registered in the error-location storing unit 15a in error detection described later. Patrol processing enables irregularities at locations having low access frequency to be detected and repaired early.

The error detector 16c is a processor that detects whether multiple read errors reoccur, by trying multiple read accesses at error locations stored in the error-location storing unit 15a. The error detector 16c performs error detection while a disk that has infrequent access requests from the host computer 20 is being patrolled. Even when read errors reoccur frequently during error detection, the data writer 16d described below writes data to the error location and error detection is performed again. When no read error is detected in error detection after writing, information identifying the successful retry location is stored in the successful-retry-location storing unit 15b. Error detection will be explained in detail later, with reference to FIG. 7.

The data writer 16d is a processor that, when a read error reoccurs many times during error detection in an error location, performed by the error detector 16c, writes data to the error location. Specifically, the data writer 16d controls the disk transfer controller 12 and the cache controller 14 so as to alternatively read the data that should be at the error location from a mirror disk, and temporarily stores it in the cache 13 before writing it in the error location.

The replacement processor 16e is a processor that allocates a new sector to replace an error location where read errors reoccur many times even in error detection after writing, during error detection by the error detector 16c, and writes data in the replacement sector. Specifically, in the same manner as the data writer 16d, the replacement processor 16e controls the disk transfer controller 12 and the cache controller 14 so as to alternatively read the data that should be at the error location from a mirror disk, and temporarily stores it in the cache 13 before writing it in the error location.

Figure 6:
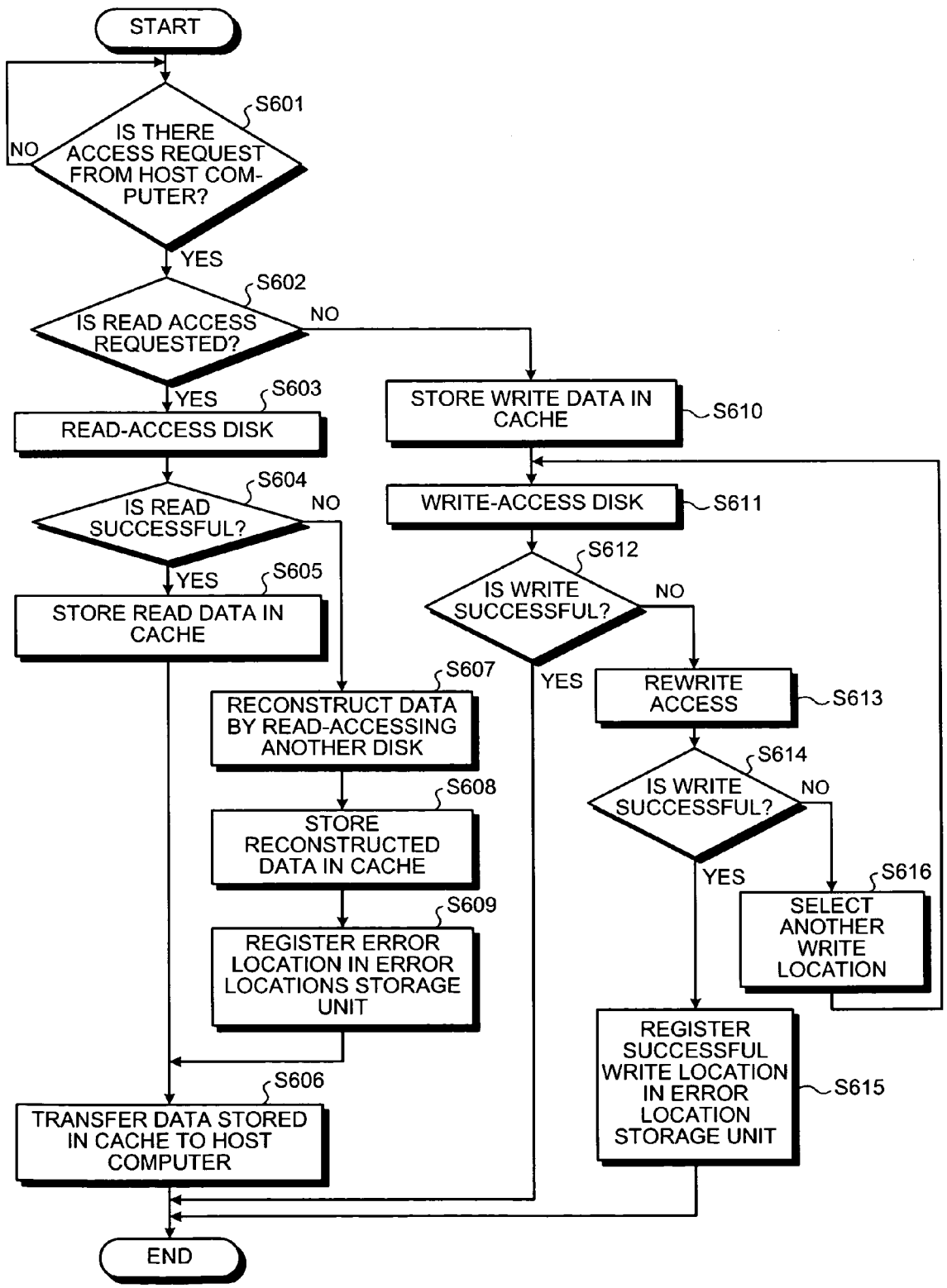
FIG. 6 is a flowchart of a sequence of access control processing according to the first embodiment.

FIG. 6 is a flowchart of a sequence of access control processing according to the first embodiment. In this example, access control processing is performed by the access controller 16a of the controller 16 in the disk controlling apparatus 10.

As shown in FIG. 6, the access controller 16a receives an access request, sent by the host computer 20, from the host transfer controller 11 (step S601: Yes), stores it in the internal memory of the controller 16, and determines whether it is a read access request or a write access request (step S602).

When the access request is a read access request (step S602: Yes), the access controller 16a controls the disk transfer controller 12 to read-access the disk, and reads the data specified by the read access request from a predetermined sector of a predetermined track of a predetermined disk in the disk controlling apparatus 10 (step S603).

When the read is successful and no read error is generated from the disk apparatus 30 in response to the read access (step S604: Yes), the access controller 16a controls the disk transfer controller 12 and the cache controller 14 so as to store the data, which is read from the disk apparatus 30, in the cache 13 (step S605). The access controller 16a also controls the host transfer controller 11 so as to transfer the read data, stored in the cache 13, to the host computer 20 (step S606), whereby the access control processing of FIG. 6 ends.

On the other hand, when the read access results in a read error from the disk apparatus 30 (step S604: No), the access controller 16a read-accesses a mirror disk via the disk transfer controller 12, reads alternative data therefrom, and reconstructs the data that should be at the error location (step S607). The access controller 16a also controls the disk transfer controller 12 and the cache controller 14 to store the reconstructed data in the cache 13 (step S608), and register the error location where the read error occurred in the error-location storing unit 15a (step S609). Thereafter, the access controller 16a controls the host transfer controller 11 to transfer the data, stored in the cache 13, to the host computer 20 (step S606), whereby the access control processing of FIG. 6 ends.

Returning to the explanation of step S602, when the access request is a write access request (step S602: No), the access controller 16a controls the host transfer controller 11 to store the write data, sent from the host computer 20, in the cache 13 (step S610). In addition, the access controller 16a write-accesses the disk by controlling the disk transfer controller 12, and writes the data, stored in the cache 13, in a predetermined sector of a predetermined track of a predetermined disk in the disk controlling apparatus 10 (step S611).

When the disk apparatus 30 does not respond to the write access with a write error and the write is successful (step S612: Yes), the access controller 16a ends access control processing at that point, as shown in FIG. 6. On the other hand, when the disk apparatus 30 responds with a write error (step S612: No), the access controller 16a controls the disk transfer controller 12 and retries to write-access the disk (step S613).

When the second write access is successful (step S614: Yes), the access controller 16a stores the rewrite location, where the data is written by the rewrite access, in the error-location storing unit 15a (step S615), and then ends access control processing as shown in FIG. 6.

Conversely, when the disk apparatus 30 responds to the rewrite access with a write error (step S614: No), the access controller 16a newly selects another sector, different from the one where the write error occurred, as a write location (step S616), then returns to step S611 and retries the write access in the new sector (step S611). In other words, new sectors are selected and write-accessed until the write data from the host computer 20 is written in one of the sectors (steps S612 and S614: Yes).

Figure 7:
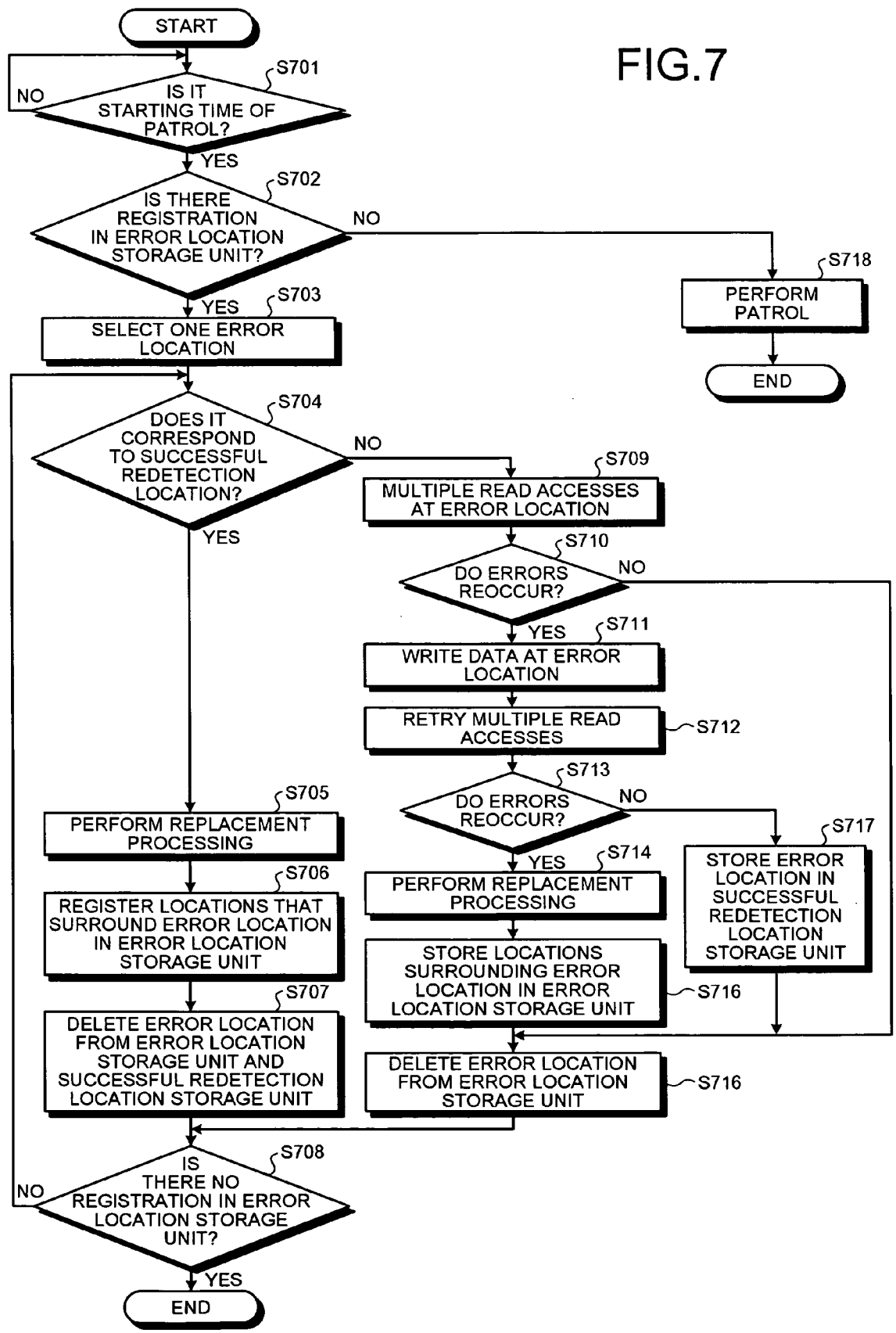
FIG. 7 is a flowchart of a sequence of error detection processing according to the first embodiment.

FIG. 7 is a flowchart of a sequence of error detection processing according to the first embodiment. The explanation below describes error detection processing performed by the error detector 16c of the controller 16 in the disk controlling apparatus 10.

As shown in FIG. 7, at the start of disk patrol at a time when there are infrequent access requests from the host computer 20 (step S701: Yes), the error detector 16c determines whether the error-location storing unit 15a stores information indicating error locations (step S702).

When the storage unit 15a stores information indicating error locations (step S702: Yes), the error detector 16c selects one of the error locations stored in the error-location storing unit 15a for error detection (step S703). Any method may be used to make this selection, such as, for example, selecting the oldest error location according to the order in which the error locations are registered in the error-location storing unit 15a.

The error detector 16c then determines whether the error detection location, selected from the error-location storing unit 15a, is registered as a successful retry location in the successful-retry-location storing unit 15b (step S704). When the error detection location corresponds to one of the successful retry locations (step S704: Yes), the error detector 16c commands the replacement processor 16e to perform replacement processing at the error detection location (step S705). Specifically, the replacement processor 16e receives the command from the error detector 16c, and controls the disk transfer controller 12 and the cache controller 14 so as to read the data that ought to be at the error location from a mirror disk, store it temporarily in the cache 13, and write it in a replacement sector.

In addition, the error detector 16c stores information indicating locations that surround the location where replacement processing is performed (e.g. the eight locations adjacent to the location of replacement processing in FIG. 3) in the error-location storing unit 15a (step S706), and deletes information that corresponds to the error location where replacement processing is performed from the error-location storing unit 15a and the successful-retry-location storing unit 15b (step S707).

The error detector 16c then determines whether the error location has disappeared from the error-location storing unit 15a (step S708), and, if not (step S708: No), returns to step S703, and selects one of error locations stored in the error-location storing unit 15a for error detection (step S703). When the error location is not registered in the error-location storing unit 15a (step S708: Yes), error detection ends as shown in FIG. 7.

Returning to the explanation of step S704, when the error detection location selected from the error-location storing unit 15a does not correspond to a successful retry location (step S704: No), the error detector 16c controls the disk transfer controller 12 to try multiple read accesses at the error location on the disk (step S709). For example, the error detector 16c detects whether more than two read errors occur after trying several tens or several hundreds of read accesses.

When many read errors occur during error detection (step S710: Yes), the error detector 16c commands the data writer 16d to write the data in the error detection location (step S711). Specifically, the data writer 16d receives the command from the error detector 16c, and controls the disk transfer controller 12 and the cache controller 14 so as to alternatively read the data that ought to be at the error location from a mirror disk, store it temporarily in the cache 13, and write it in the error location.

Following the writing, the error detector 16c controls the disk transfer controller 12 to retry multiple read accesses in the error location on the disk, and determines whether multiple read errors reoccur (step S712). When error detection after writing results in multiple read errors (step S713: Yes), the error detector 16c commands the replacement processor 16e to perform replacement processing at the error location (step S714).

After replacement processing, the error detector 16c stores information, which indicates the surrounding locations of the location where replacement processing is performed, in the error-location storing unit 15a (step S715), and deletes information, which corresponds to the error location where replacement processing is performed, from the error-location storing unit 15a (step S716). As shown in FIG. 7, the error detector 16c then shifts to the processing of step S708 and determines whether the record of the error location has disappeared from the error-location storing unit 15a (step S708).

Returning to the explanation of step S713, when many read errors reoccur during error detection after writing (step S713: No), the error detector 16c stores information, which identifies the error location where error detection is performed, as a successful retry location in the successful-retry-location storing unit 15b (step S717), and deletes the information that corresponds to the error location from the error-location storing unit 15a (step S716). As shown in FIG. 7, the error detector 16c then shifts to the processing of step S708.

Returning to the explanation of step S710, when many read errors do not reoccur during error detection after writing (step S710: No), the error detector 16c deletes information, which corresponds to the error location where error detection is performed, from the error-location storing unit 15a (step S716), and shifts to the processing of step S708 as shown in FIG. 7.

Returning to the explanation of step S702, when the error-location storing unit 15a contains no information indicating the error location at the start of disk patrol (step S702: No), the error detector 16c commands the patroller 16b to perform patrol (step S718), and then ends error detection, as shown in FIG. 7. Specifically, the patroller 16b receives the command from the error detector 16c, detects irregularities by patrolling the entire side of a disk in the disk apparatus 30, and performs diagnosis and repair at locations where irregularities are detected. The error detector 16c then stands-by until the start of the next disk patrol.

As described above, according to the first embodiment, when a plurality of read errors occurs while trying multiple read accesses at an error location, it is determined that the medium failure cannot be ignored, and replacement processing is performed. Replacement processing is performed when many read errors result from serious or minor medium failures, but not performed when the read errors are the result of sporadic causes. This makes it possible to determine precisely whether the read errors require replacement processing, so that replacement processing can be performed where appropriate, thereby preventing double malfunctions and reduction in the performance of the disk controlling apparatus 10, while avoiding wasteful consumption of replacement locations on the disk.

According to the first embodiment, instead of performing error detection when a read error occurs, error detection is performed retrospectively by storing information identifying the error location in the error-location storing unit 15a. This gives priority to the response to the host computer 20 when a read error occurs, and avoids reducing the response performance. Particularly, since error detection is performed while patrolling a disk that receives infrequent accesses requests from the host computer 20, reduction in the response performance can be reliably prevented. Even when the number of read accesses is greatly increased, there is no risk of reducing the performance while the disk is being patrolled, so that the necessity of replacement processing can be determined even more precisely from the increased number of read accesses. Rather than diagnosing the entire face of the disk during disk patrol, only error locations on the disk are diagnosed in concentration, making the diagnosis more efficient.

According to the first embodiment, even when many read errors reoccur, after writing data at the error location, replacement processing is only performed after retrying the read access to detect whether the read error reoccurs. Read errors that are caused by thermal demagnetization do not reoccur during error detection after writing, and therefore, replacement processing is not performed. This avoids wasteful consumption of replacement locations on the disk. Furthermore, in error detection after writing, it is determined whether many read errors reoccur by trying multiple read accesses, enabling the necessity of replacement processing for read errors that are caused sporadically, or by minor medium failures, to be determined precisely.

According to the first embodiment, a location where read errors do not reoccur during error detection after writing is registered in the successful-retry-location storing unit 15b as a successful retry location, and, when a read error reoccurs at this successful retry location, replacement processing is performed without further error detection. Since replacement processing is performed actively at locations where there is a high possibility of subsequent read errors, it becomes possible to actively prevent double malfunctions and reduction in the performance of the disk controlling apparatus 10.

According to the first embodiment, replacement processing is performed after similarly performing error detection in locations that surround one where replacement processing has been performed. Replacement processing is thereby performed after error detection in locations where there is a high possibility of similar medium failure, so that read errors that are likely to occur can be prevented beforehand, actively preventing any reduction in the performance of the disk controlling apparatus 10.

According to the first embodiment, replacement processing is performed after similarly performing error detection in locations in write locations, where data has been written by rewrite-access after a write error occurs. Replacement processing is thereby performed after error detection in locations where there is a possibility of failure of some kind, so that read errors that are likely to occur can be prevented beforehand, actively preventing any reduction in the performance of the disk controlling apparatus 10.

While the disk controlling apparatus 10 according to the first embodiment has been described, the present invention is not limited to this, and may be modified in various ways. Accordingly, various modifications will be explained, as a disk controlling apparatus according to the second embodiment.

While the first embodiment describes error detection at the start of disk patrol, the present invention is not limited to this. As shown in FIG. 8, error detection may be performed at any given time, such as at another retrospective timing or immediately after a read error. FIG. 8 is a diagram for explaining timings, targets, and methods, of error detection.

The first embodiment describes cases that the targets of error detection are locations that surround one where replacement processing is performed, and rewrite locations where data is written by rewrite-access after a write error, not only the read error locations. However, the present invention is not limited to these cases. As shown in FIG. 8, error detection may be performed only in read error locations, or in read error locations and locations that surround a replacement location, or in read error locations and rewrite locations.

While the first embodiment describes a case that error detection is performed by writing data and then retrying multiple read accesses after first performing error detection by multiple read accesses, and a case that, when a read error reoccurs at a successful retry location, replacement processing is performed without further error detection, the present invention is not limited to this, as shown in FIG. 8. For example, error detection after writing data may be performed by only one read access, replacement processing need not be performed in successful retry locations, and instead of error detection after writing data, only error detection by multiple read accesses may be performed. Simplifying the method of error detection in this way shortens the time required to perform it.

When executing replacement processing based on a successful retry location, the condition for executing replacement processing may be the reoccurrence of one read error at the successful retry location. The present invention is not limited to this. For example, the condition may be that multiple (e.g. more than three) read errors reoccur at the successful retry location. In the latter case, even when an error location selected from the error-location storing unit 15a corresponds to a successful retry location, replacement processing is not immediately executed unless the number of read errors that reoccur at the successful retry location reaches a predetermined number. Instead, the error detection described above (writing data after multiple read accesses, and then detecting errors by retrying multiple read accesses) is performed.

While the first embodiment describes a case that, after error detection based on multiple read accesses, data is written and error detection is performed again by retrying multiple read accesses, the present invention is not limited to this. As shown in FIG. 8, error detection may be performed by read access after first writing the data at the error location. Here too, read errors caused by thermal demagnetization do not reoccur during error detection after writing, and therefore, replacement processing is not performed, making it possible to determine precisely whether a read error requires replacement processing, and to perform replacement processing where appropriate. Therefore, wasteful consumption of replacement locations on the disk can be prevented.

When performing error detection after first writing data at the error location, the present invention is not limited to detecting errors by one read access, and errors may be detected by multiple read accesses. In the latter case, the necessity of replacement processing for read errors caused sporadically, or by minor medium failures, can be determined precisely, while preventing double malfunctions and reduction in the performance of the disk controlling apparatus 10.

While the first embodiment describes a case that the present invention is applied in the disk controlling apparatus 10 that controls the disk apparatus 30 comprising the RAID 1, the present invention is not limited to this, and can be similarly applied in the disk controlling apparatus 10 that controls the disk apparatus 30 comprising another RAID (e.g. RAID 2 to 5 and RAID 0). Even when the disk apparatus 30 comprises another RAID, read errors returned from the disk apparatus 30 in response to read accesses are dealt with by error processing as it is described in the present invention, whereas errors relating to inaccuracies in read data, caused by so-called fixed bits and the like, are not dealt with by error processing as described in the present invention.

The constituent elements of the disk controlling apparatus 10 shown in FIG. 2 are functionally separate, and need not have the physically arrangement shown in FIG. 2. That is, the specific arrangement of the distribution and integration of the disk controlling apparatus 10 is not limited to that shown in FIG. 2, and all or part of it can be functionally and physically distributed and integrated in given units, corresponding to the load and usage of the various elements. Some or all of the processing functions executed by each apparatus may be realized by a central processing unit (CPU) and a program that the CPU executes analytically. Alternatively, the processing functions may be executed by hardware using wired logic.

Unless stated otherwise, the sequences of access control processing and error detection processing described according to the first embodiment can be modified. For example, in the access control described in FIG. 6, the processes of step S608 (storing reconstructed data in the cache) and step S609 (registering an error location) may be executed in reverse order. In the error detection shown in FIG. 7, the processes of step S706 (registering locations that surround an error location) and step S707 (deleting the error location) may be executed in reverse order. The processes from steps S714 to S716, and those from steps S717 to S716, may be also reversed.

Figure 9:
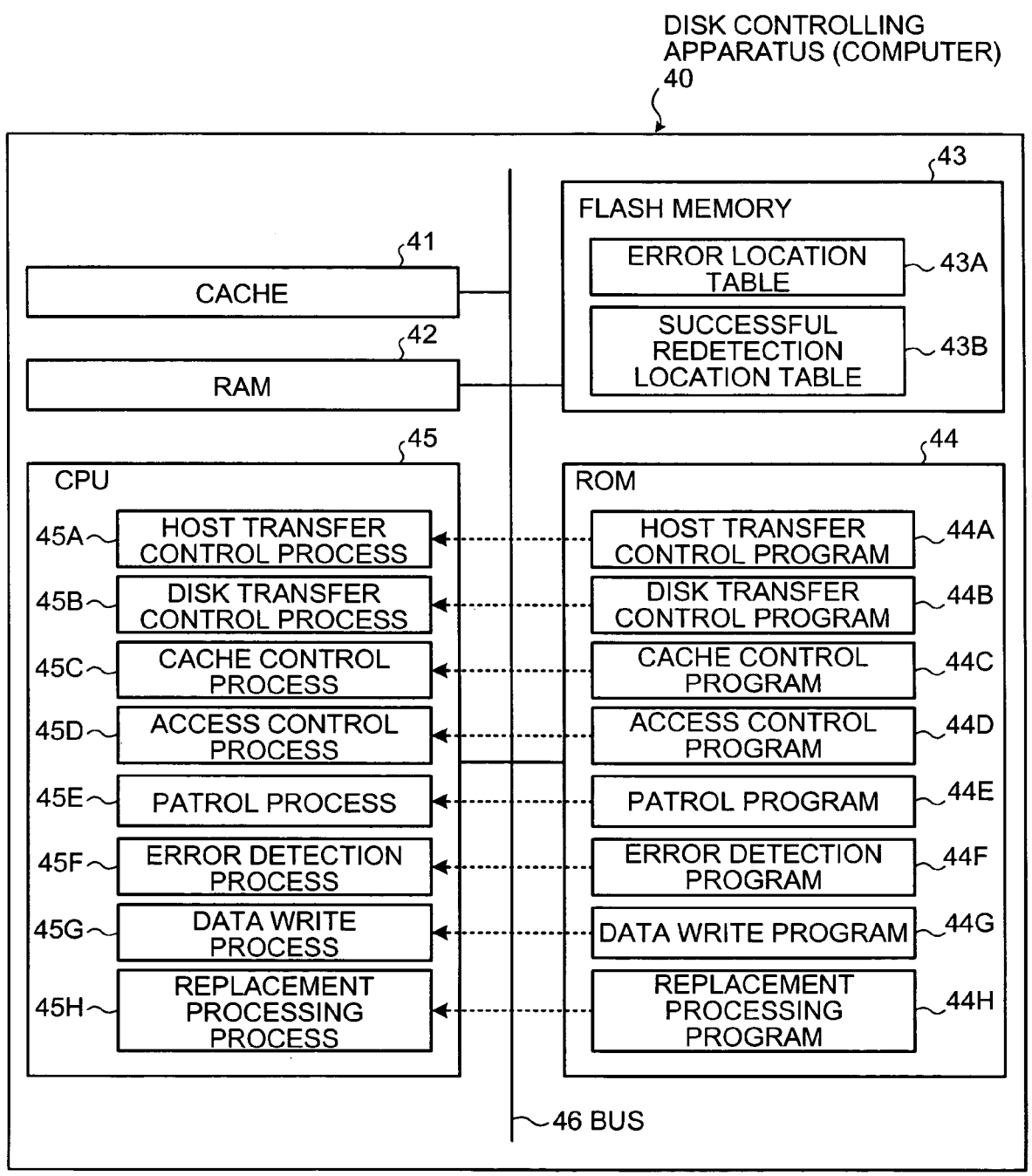
FIG. 9 is a diagram of a computer that executes a disk control program.

The various processes described according to the first embodiment can be realized by making a computer, such as a PC or a workstation, execute programs that are prepared beforehand. FIG. 9 will be referred to explain an example of a computer that executes a disk control program having functions similar to those as the first embodiment.

FIG. 9 is a diagram of a computer that executes a disk control program. As shown in FIG. 9, a computer 40 functioning as a disk controlling apparatus includes a cache 41, a random access memory (RAM) 42, a flash memory 43, a read only memory (ROM) 44, and a CPU 45, these being connected via a bus 46. As shown in FIG. 9, disk control programs that perform similar functions to those of the first embodiment (i.e. a host transfer control program 44a, a disk transfer control program 44b, a cache control program 44c, an access control program 44d, a patrol program 44e, an error detection program 44f, a data write program 44g, and a replacement processing program 44h) are stored beforehand in the ROM 44.

As shown in FIG. 9, the CPU 45 reads and executes the programs 44a to 44h, whereby they become a host transfer control process 45a, a disk transfer control process 45b, a cache control process 45c, an access control process 45d, a patrol process 45e, an error detection process 45f, a data write process 45g, and a replacement processing process 45h. The processes 45a to 45h respectively correspond to the host transfer controller 11, the disk transfer controller 12, the cache controller 14, the access controller 16a, the patroller 16b, the error detector 16c, the data writer 16d, and the replacement processor 16e, shown in FIG. 2.

As shown in FIG. 9, the flash memory 43 includes an error location table 43a, which stores information indicating error locations on the disks, and a successful retry location table 43b, which stores information indicating successful retry locations on the disks. The CPU 45 registers and deletes information to/from the error location table 43a and the successful retry location table 43b, reads information from the error location table 43a and the successful retry location table 43b and stores it in the RAM 42, and executes error detection processing and the like based on the information stored in the RAM 42. The error location table 43a and the successful retry location table 43b respectively correspond to the error-location storing unit 15a and the successful-retry-location storing unit 15b shown in FIG. 2.

The cache 41 is a memory that temporarily stores write data, sent from the host computer 20, and read data, read from the disk apparatus 30 (in addition to data that is reconstructed with an occurrence of a read error occurs). The cache 41 corresponds to the cache 13 of FIG. 2.

The programs 44a to 44h is not necessarily have to be stored in the ROM 44, and may instead be stored in a "portable physical medium" that is inserted into the computer 40, such as a flexible disk (FD), a CD-ROM, an magneto-optical (MO) disk, a digital versatile disk (DVD), an optical magnetic disk, an integrated circuit (IC) card, or in a "fixed physical medium" such as a hardware drive that is fitted inside or outside the computer 40, or in "another computer (or server)" that connects to the computer 40 via a public line, the Internet, a local area network (LAN), a wide area network (WAN), or the like, the computer 40 reading and executing the programs 44a to 44h therefrom.

According to the present invention, when read errors reoccur many times while retrying multiple read-accesses, it is determined that there is a medium failure that cannot be ignored, and replacement processing is performed. Since serious and minor medium failures result in many read errors, replacement processing is performed. Since sporadic causes do not result in many read errors, replacement processing is not performed. This makes it possible to determine precisely whether a read error requires replacement processing, and perform replacement processing where appropriate. This avoids reducing the performance of the disk controlling apparatus, and prevents double malfunctions, while also avoiding wasteful consumption of replacement regions of the disk.

According to the present invention, error detection is not executed when a read error occurs, but is executed retrospectively by storing information that identifies the error location. This gives priority to the response to the higher-level apparatus when a read error occurs, and avoids reducing the response performance. Particularly, since errors are detected while patrolling a disk that receives infrequent accesses requests from the higher-level apparatus, reduction in the response performance can be reliably prevented. Even when the number of read accesses is greatly increased, there is no risk of reducing the performance while the disk is being patrolled, so that the necessity of replacement processing can be determined even more precisely from the increased number of read accesses. Rather than diagnosing the entire face of the disk during disk patrol, only error locations on the disk are diagnosed in concentration, making the diagnosis more efficient.

According to the present invention, even when many read errors reoccur, after writing data at the error location, replacement processing is only performed after retrying the read access to detect whether the read error reoccurs. Read errors that are caused by thermal demagnetization do not reoccur during error detection after writing, and therefore, replacement processing is not performed. This avoids wasteful consumption of replacement locations on the disk. In error detection after writing, it is determined whether many read errors reoccur by trying multiple read accesses, enabling the necessity of replacement processing for read errors that are caused sporadically, or by minor medium failures, to be determined precisely.

According to the present invention, a location where read errors do not reoccur during error detection after writing is registered as a successful retry location, and, when a read error reoccurs at the successful retry location, replacement processing is performed without further error detection. Since replacement processing is performed actively at locations where there is a high possibility of subsequent read errors, it becomes possible to actively prevent double malfunctions and reduction in the performance of the disk controlling apparatus.

According to the present invention, replacement processing is performed after similarly detecting errors in locations that surround one where replacement processing has been performed. Replacement processing is thereby performed after error detection in locations where there is a high possibility of similar medium failure, so that read errors that are likely to occur can be prevented beforehand, actively preventing any reduction in the performance of the disk controlling apparatus.

According to the present invention, replacement processing is performed after similarly detecting errors in locations in write locations, where data has been written by rewrite-access after a write error occurs. Replacement processing is thereby performed after error detection in locations where there is a possibility of failure of some kind, so that read errors that are likely to occur can be prevented beforehand, actively preventing any reduction in the performance of the disk controlling apparatus.

According to the present invention, when a read error reoccurs in response to a read access after writing data at an error location, it is determined that the failure cannot be ignored and replacement processing is performed. Since read errors caused by thermal demagnetization do not reoccur during error detection after writing, replacement processing is not performed. This makes it possible to determine precisely whether a read error requires replacement processing, and to perform replacement processing where appropriate. Therefore, wasteful consumption of replacement locations on the disk can be prevented.

According to the present invention, in error detection after writing, it is determined whether many read errors reoccur by trying multiple read accesses. This enables the necessity of replacement processing for read errors that are caused sporadically, or by minor medium failures, to be determined precisely, while also preventing double malfunctions and reduction in the performance of the disk controlling apparatus.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A replacement processing apparatus that performs a write-access of a recording medium in response to access request from a higher-level apparatus, the replacement processing apparatus comprising:

a writing unit that writes data into a write location on the recording medium according to the write-access and, when writing is not successful, rewrites the data into the write location;

a storing unit that, when rewriting by the writing unit is successful, stores rewrite location information indicating the write location where the data is successfully rewritten;

an error detecting unit that tries a plurality of read accesses to the write location indicated by the rewrite location information to detect whether a read error recurs a plurality of times; and a replacement processing unit that performs, when the error detecting unit detects that the read error recurs a plurality of times, a replacement processing for the write location.

2. The replacement processing apparatus according to claim 1, further comprising an error-location storing unit that stores information indicating an error location on the recording medium where a read error occurs, wherein the error detecting unit tries, when patrolling the recording medium, the read-accesses to the write location and the error location based on the rewrite location information and the information stored in the error-location storing unit.

3. The replacement processing apparatus according to claim 2 wherein the writing unit writes, when the error detecting unit detects that the read error recurs a plurality of times, data into the error location, the error detecting unit retries the read accesses to the error location where the data is written by the writing unit, and the replacement processing unit performs, when the error detecting unit detects that the read error recurs a plurality of times at a time of a retry of the read accesses to the error location where the data is written by the writing unit, the replacement processing for the error location.

4. The replacement processing apparatus according to claim 3, further comprising a successful-retry-location storing unit that, when the error detecting unit detects that the read error does not recur, stores the error location as a successful retry location, wherein, when the read error recurs at the successful retry location stored in the successful-retry-location storing unit, the replacement processing unit performs the replacement processing for the successful retry location.

5. The replacement processing apparatus according to claim 1, wherein the error detecting unit also tries the read accesses to other locations surrounding the error location, where the replacement processing is performed by the replacement processing unit, to detect whether the read error recurs a plurality of times, and the replacement processing unit also performs, when the error detecting unit detects that the read error recurs a plurality of times at the other locations, the replacement processing for the locations.

6. A replacement processing method of performing a write-access of a recording medium in response to access request from a higher-level apparatus, the replacement processing method comprising:

writing data into a write location on the recording medium according to the write-access;

rewriting, when the writing is not successful, the data into the write location;

storing, when the rewriting is successful, rewrite location information indicating the write location where the data is successfully rewritten;

trying a plurality of read accesses to the write location indicated by the rewrite location information to detect whether a read error recurs a plurality of times; and performing, when the read error recurs a plurality of times, a replacement processing for the write location.

7. A computer-readable recording medium that stores a computer program for performing a write-access of a recording medium in response to access request from a higher-level apparatus, wherein the computer program makes a computer execute operations comprising:

writing data into a write location on the recoding medium according to the write-access;

rewriting, when the writing is not successful, the data into the write location;

storing, when the rewriting is successful, rewrite location information indicating the write location where the data is successfully rewritten:

trying a plurality of read accesses to the write location indicated by the rewrite location information to detect whether a read error recurs a plurality of times; and performing, when the read error recurs a plurality of times, a replacement processing for the error location.

* * * * *

UNITED STATES PATENT AND TRADEMARK OFFICE
CERTIFICATE OF CORRECTION

| | | |
|---|---|---|
| PATENT NO. | : 7,415,636 B2 | Page 1 of 1 |
| APPLICATION NO. | : 11/017946 | |
| DATED | : August 19, 2008 | |
| INVENTOR(S) | : Eisaku Takahashi | |

It is certified that error appears in the above-identified patent and that said Letters Patent is hereby corrected as shown below:

Column 16, Line 10, change "2" to --2,--.

Column 17, Line 7, change "rewritten:" to --rewritten;--.

Signed and Sealed this

Eleventh Day of November, 2008

JON W. DUDAS
*Director of the United States Patent and Trademark Office*